Patented Apr. 6, 1943

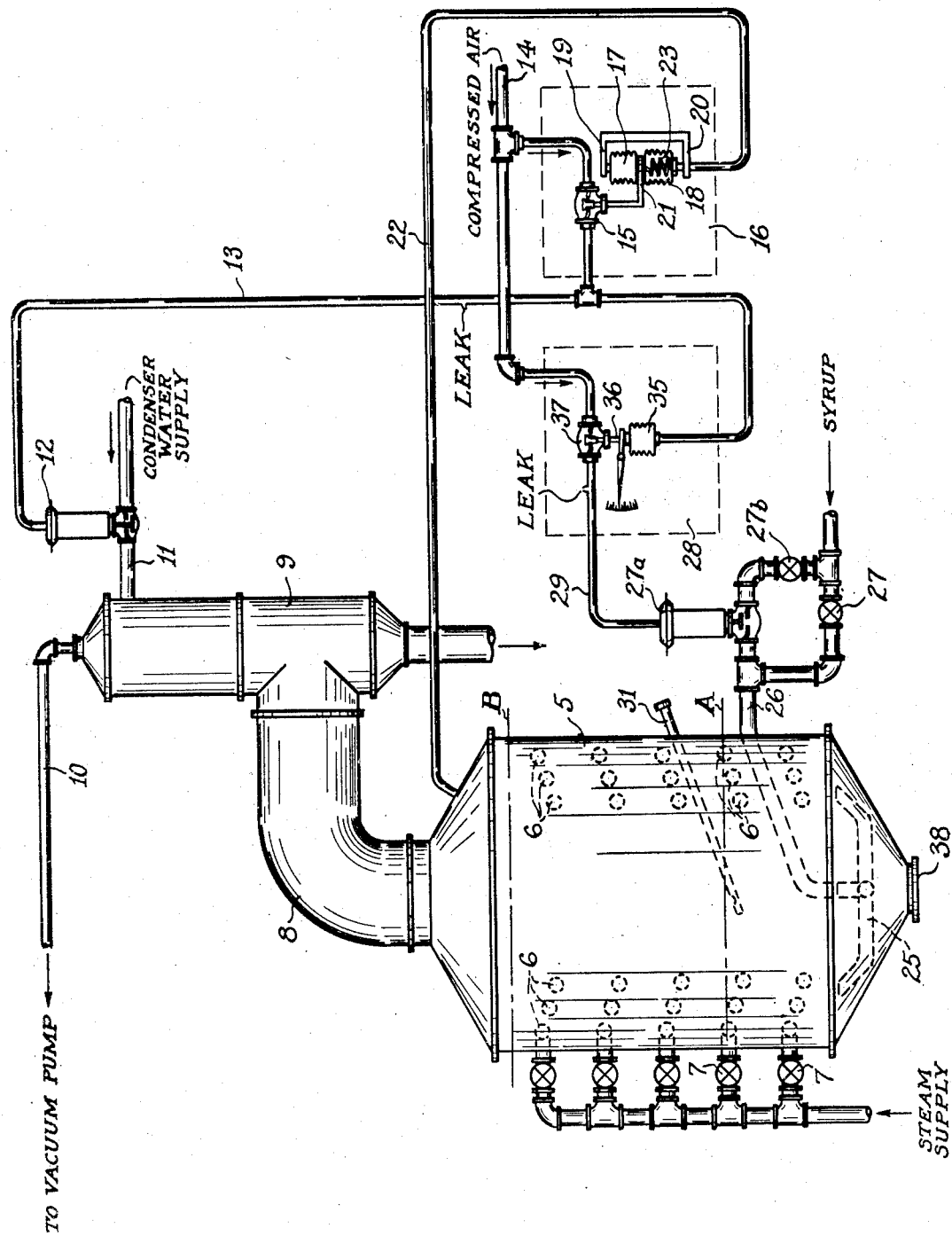

2,315,683

UNITED STATES PATENT OFFICE 2,315,683

APPARATUS FOR CONTROLLING CRYSTAL GROWTH

John G. Ziegler, Rochester, N. Y., assignor to Taylor Instrument Companies, Rochester, N. Y., a corporation of New York Application July 24, 1940, Serial No. 347,175

2 Claims. (Cl. 159—44)

This invention relates to an apparatus for controlling the operation of a vacuum pan.

In the production of granulated sugar, it is the practice to boil concentrated sugar syrup in a vacuum pan until the syrup is supersaturated after which the supersaturated syrup is "shocked" or grained by the addition of a small amount of dry sugar to produce a myriad of small crystals. The crystal-impregnated syrup is further boiled with the addition of fresh syrup, that is, syrup below supersaturation, to promote crystal growth and this is continued until the crystals reach the desired size. At such time the addition of fresh syrup is discontinued and the syrup with the grown crystals therein is further boiled in the vacuum pan to increase its concentration to a point where it will just flow from the pan, whereupon it is discharged therefrom. It has been found that if the process is not properly controlled, the sugar crystals will not be of the desired uniformity and the efficiency of the vacuum pan will be reduced.

In the past, it has been necessary to rely entirely on the skill of an operator known as a "sugar boiler" for the proper operation of the vacuum pan. However, a human operator is never exact in controlling process operations, with the result that the vacuum pan is not consistently operated at the optimum condition of the contents and the resulting sugar is not always uniform. In other words, the boiling of the sugar is dependent on the skill of the operator and on the attention which he gives to the operation.

In accordance with the main feature of the invention there is provided a method of operating a vacuum pan whereby many of the disadvantages of operator control, are obviated. This method gives the operator an indication of the condition in the pan and allows him to set the control system for best conditions of operation after which the system maintains these conditions.

In accordance with a further feature of the invention there is provided apparatus for automatically controlling the various critical operations related to a vacuum pan.

In the drawing, which diagrammatically illustrates the sugar boiling system of the present invention, 5 generally designates a vacuum pan for concentrating sugar syrup or massecuite and for effecting the growth of sugar crystals therein. This vacuum pan is provided with suitable individual heating coils 6 into which steam at a uniform pressure is introduced under the control of the hand valves 7, to cause the boiling of the mass. The upper end of the vacuum pan is dome-shaped and communicates through a pipe 8 with a condenser 9 of well-known construction. The top of the condenser is closed, except that it communicates through a pipe 10 with a vacuum pump (not shown), which pump removes air and non-condensible gases from the pan. A pipe 11 communicating with the interior of the condenser, is connected with a source of cooling water under a uniform head. The flow of this cooling water through the pipe 11 is controlled by a pneumatically operated valve 12, of known construction, having a diaphragm motor top to which compressed air is supplied to operate the valve against the action of a spring (not shown). The air applied to the motor top of the valve 12 is supplied through a conduit 13 which communicates with a compressed air supply conduit 14 under the control of an air relay valve 15 of an absolute pressure or vacuum controller 16 of the recording type.

This controller may be of any known construction but as herein shown it includes two opposing metal bellows 17 and 18 having their remote ends secured to arms 19 and 20 of a fixed U-shaped bracket. The adjacent or movable ends of the bellows are connected to one end of an arm 21 extending at right angles from the valve stem of relay air valve 15. The bellows 17 is evacuated while the interior of the bellows 18 communicates with the vacuum pan through the conduit 22. A spring 23 mounted within the bellows 18, has its ends secured to the ends of this bellows so that the action thereof will be proportional to the pressure supplied through the conduit 22. It will be understood that the arrangement of the bellows 17 and 18 is such that the controller operation is independent of varying atmospheric pressures. By this arrangement, as the pressure varies in the space at the top of the vacuum pan 5, the absolute pressure controller 16 responds accordingly to vary the opening through the relay valve 15 thereby permitting a greater or lesser amount of compressed air to flow from the compressed air supply conduit 14 to the conduit 13 and thence to the motor top of the valve 12. Consequently, as the absolute pressure rises, the valve 12 will operate correspondingly to allow a greater amount of the cooling water to flow into the condenser 9. When the pressure in the pan 5 drops, the valve 12 reduces the flow of the cooling water to the condenser. In this way the absolute pressure in the pan is maintained at any predetermined value.

There is provided in the lower portion of the vacuum pan, preferably below the heating coils 6, a discharge pipe 25 having openings therein through which syrup may be introduced into the vacuum pan from the pipe 26, in turn, connected with a source of fresh syrup below supersaturation. The flow of the syrup through the pipe 26 is controlled either by the hand valve 27 or by a pneumatically-operated diaphragm valve 27a of a construction similar to the valve 12. The amount of compressed air supplied to the motor top of the valve 27a is, in this instance, determined by a pressure type of recording regulator 28. This pressure regulator includes a bellows 35 responsive to the pressure of the compressed air present in the conduit 13. The bellows 35 actuates a valve stem 36 which, in turn, operates a relay air valve 37 to control the flow of compressed air from the supply conduit 14, through the conduit 29 and thence to the top of the diaphragm motor valve 27a.

A test rod 31, which normally closes an opening in a side wall of the pan, enables the operator to withdraw a sample of the syrup and serves as a means for introducing sugar grains to "shock" the charge in the pan.

It has been discovered that the viscosity of the massecuite in the pan is one of the most important variables determining crystal growth and can be used to control the flow of the right amount of syrup through the feed supply pipe 26 into the pan and thereby promote uniform crystal growth. It has also been found that the coefficient of heat transfer from the steam in the coils 6 to the boiling syrup mixture is an effective indication of the viscosity of the mixture in the pan and this measurement of the coefficient of heat transfer can be utilized to feed the syrup into the pan at the proper rate to promote a uniform crystal growth.

In the operation of the system, syrup or massecuite is introduced under the control of the hand valve 27, into the vacuum pan to a level approximately that indicated by the dotted line A in Fig. 1. Steam under uniform pressure is then introduced into the submerged heating coils 6 and at the same time the vacuum pump (not shown) is started to draw air from the pan through the conduit 10 and the condenser 9. This condenser, in turn, communicates through the pipe 8 with the top of the vacuum pan 5. Also a source of condenser or cooling water under a uniform head is supplied to the pipe 11 and a source of compressed air is available through the conduit 14 to serve as a motive power for the pneumatically operated valves 12 and 27a. During this time the hand-valve 27 in the syrup supply pipe, is closed so that no syrup is fed into the vacuum pan at this time. The boiling of the syrup proceeds under the pressure at which the absolute pressure controller 16 is set, say 6" of mercury during the preliminary stage. It will be understood that when the absolute pressure in the pan increases due to the fact that insufficient water is being supplied through valve 12 to condense the vapor given off by the syrup, the absolute pressure controller will operate to open the valve 12, thereupon cooling water will flow at an increased rate through the pipe 11 into the condenser in order to restore the predetermined pressure in the pan. The boiling is continued until the syrup reaches the necessary coefficient of supersaturation. This condition is indicated when a thermometer (not shown) in the boiling syrup indicates a reading of approximately 76° C. at 6" absolute pressure, or when the pressure gauge 28, which is calibrated in terms of the position of the valve 12, indicates a reading corresponding to a predetermined opening of this valve, say 25% opening.

When this supersaturation is reached, the operator withdraws the test rod 31 and introduces a quantity of very fine sugar crystals into the supersaturated syrup to "shock" the solution, with the result that myriads of infinitesimally small crystals are produced. The absolute pressure controller 16 is now set to maintain a pressure of 8" to 9" of mercury in the vacuum pan. The boiling of the syrup thus impregnated with small crystals continues and whenever the pressure in the vacuum pan deviates from the given pressure, the absolute pressure controller 16 opens or closes the valve 12 slightly regulating the flow of cooling water into the condenser. This results in restoring the pressure in the pan to the given value. Due to the continued boiling, crystals grow in size and occupy a greater proportion of the massecuite volume. The viscosity of the mixture increases and the boiling rate decreases due to lower transfer of heat through the coils 6 to the more viscous fluid. When the boiling rate falls to a certain point, indicated by gauge 28, valve 27a is opened by the control mechanism to introduce syrup and maintain this value of viscosity. In response to the change in compressed air pressure in the conduit 13, to effect the last-mentioned operation of the valve 12, the pressure regulator 28 also operates to supply compressed air at an increased pressure to the top of the motor valve 27a. The valve 27a thus opens to feed fresh syrup into the vacuum pan, in an amount just sufficient to restore the desired degree of viscosity of the mixture in the pan. It will be appreciated that if the fresh syrup is added too freely, the crystals in the boiling syrup will tend to dissolve and become reduced in size, whereas if the fresh syrup is added too slowly the viscosity of the boiling mixture will increase with the result that the rate of evaporation will decrease and there will be a tendency toward formation of conglomerate grain.

As the level of the syrup in the vacuum pan rises due to the gradual addition of fresh syrup, each heating coil 6 as it becomes submerged, has steam introduced therein by opening its related hand valve 7. The boiling of the syrup and the gradual addition of fresh syrup thereto in amounts just sufficient to maintain a given viscosity, is continued until the level of the syrup in the vacuum pan reaches the point indicated at B. The hand valve 27b in the syrup supply line is then closed by the operator but the boiling of the mixture in the pan is continued with an increase in viscosity, until the syrup with the grown crystals therein is of such viscosity that it will just flow from the pan, a condition indicated when the pressure gauge 28 shows a certain small opening of the valve 12, say 10%. It will be appreciated that when the vacuum pan is first charged, the viscosity of the syrup will be relatively low with the result that there will be a rapid heat transfer through the wall of the heating coil 6 from the steam to the syrup. Since the pressure of the steam is uniform and since the conductivity of the metal in the heating coils 6 is uniform at all times, the only variable is the viscosity of the mixture surrounding the coil. It has been found that when the viscosity of the mixture is relatively low, there is a rapid transfer of heat from the steam thereto. However, when the viscosity of the mixture is high, the heat transfer from the steam thereto takes place at a relatively slow rate. It will be appreciated that when this heat transfer is rapid, the syrup in the pan will boil vigorously and will rapidly give off vapor. This vapor tends to lower the vacuum in the top of the vacuum pan, and since the absolute pressure controller 16 communicates through the conduit 22 with the space at the top of the vacuum pan, this absolute pressure controller 16 responds to this increased pressure. The controller 16, in response to the increased pressure in the pan, applies compressed air through the conduit 13 to the top of the motor diaphragm valve 12. On the application of compressed air to this diaphragm top, the valve opens to permit an increased flow of cooling water to the condenser until the vacuum in the pan 5 is restored to its predetermined value. Thus the percentage of opening of the valve 12 may be utilized as an effective measure of the viscosity of the mixture in the vacuum pan. At the end of the boiling operation, the foot valve 38 closing the discharge outlet of the vacuum pan, is opened and the syrup with the full grown crystals therein is discharged through this outlet into a centrifugal separator (not shown).

I claim:

1. In an arrangement of the class described, a vacuum pan, means for heating said pan, a pipe for supplying syrup or the like to said pan, means including a pressure controller for maintaining a predetermined degree of pressure in said pan, and means responsive to the operation of said controller in reducing said pressure for likewise reducing the flow through said pipe.

2. In an arrangement of the class described, a vacuum pan, means for heating said pan, a pipe for supplying syrup or the like to said pan, means for developing a predetermined pressure in said pan, means including a condenser communicating with said pan, and a supply of cooling medium for said condenser, means responsive to the pressure in said pan for regulating the supply of cooling medium, and means for varying the flow through said pipe as an inverse function of the flow of the supply of cooling medium.

JOHN G. ZIEGLER.